US010866830B2

United States Patent
Inami

(10) Patent No.: US 10,866,830 B2
(45) Date of Patent: Dec. 15, 2020

(54) VIRTUAL COMPUTER SYSTEM PERFORMANCE PREDICTION DEVICE, PERFORMANCE PREDICTION METHOD, AND PROGRAM STORAGE MEDIUM

(71) Applicant: NEC CORPORATION, Tokyo (JP)

(72) Inventor: Koji Inami, Tokyo (JP)

(73) Assignee: NEC CORPORATION, Minato-ku (JP)

(*) Notice: Subject to any disclaimer, the term of this patent is extended or adjusted under 35 U.S.C. 154(b) by 374 days.

(21) Appl. No.: 15/751,334

(22) PCT Filed: Aug. 5, 2016

(86) PCT No.: PCT/JP2016/003621
§ 371 (c)(1),
(2) Date: Feb. 8, 2018

(87) PCT Pub. No.: WO2017/029785
PCT Pub. Date: Feb. 23, 2017

(65) Prior Publication Data
US 2018/0239638 A1    Aug. 23, 2018

(30) Foreign Application Priority Data
Aug. 19, 2015    (JP) .................................. 2015-161622

(51) Int. Cl.
G06F 9/46       (2006.01)
G06F 9/48       (2006.01)
(Continued)

(52) U.S. Cl.
CPC ........ G06F 9/4881 (2013.01); G06F 9/45558 (2013.01); G06F 9/46 (2013.01);
(Continued)

(58) Field of Classification Search
CPC ...... G06F 9/4881; G06F 9/45558; G06F 9/46; G06F 9/48; G06F 9/5038; G06F 9/5077; G06F 11/34; G06F 11/3419
See application file for complete search history.

(56) References Cited

U.S. PATENT DOCUMENTS

2011/0246990 A1* 10/2011 Shimogawa .......... G06F 9/4881
718/1
2012/0124363 A1* 5/2012 Dietrich .............. G06F 11/3466
713/100

FOREIGN PATENT DOCUMENTS

JP    2006-059052 A    3/2006
JP    2014-132419 A    7/2014
(Continued)

OTHER PUBLICATIONS

International Search Report for PCT/JP2016/003621 dated Oct. 4, 2016.
(Continued)

Primary Examiner — Wissam Rashid
(74) Attorney, Agent, or Firm — Sughrue Mion, PLLC

(57) ABSTRACT

To estimate the relation between virtual machine performance and scheduling parameters which are set in a scheduler which allocates CPU time to a virtual machine, provided is a performance prediction device, comprising a measuring unit and an estimation unit. The measuring unit sets the scheduling parameters to sample values, operates a virtual computer system, and measures CPU allocation delay time from when the virtual machine requests an allocation of the CPU to when the CPU is allocated to the virtual machine and turnaround time (TAT) of the virtual machine. Based on the results of the measurements, the estimation unit generates an estimation formula with the scheduling parameters and the CPU allocation delay time as
(Continued)

explanatory variables and an estimated TAT as the response variable.

12 Claims, 13 Drawing Sheets

(51) Int. Cl.
*G06F 11/34* (2006.01)
*G06F 9/455* (2018.01)
*G06F 9/50* (2006.01)

(52) U.S. Cl.
CPC .............. *G06F 9/48* (2013.01); *G06F 9/5038* (2013.01); *G06F 9/5077* (2013.01); *G06F 11/34* (2013.01); *G06F 11/3419* (2013.01)

(56) References Cited

FOREIGN PATENT DOCUMENTS

| | | |
|---|---|---|
| JP | 2014-153852 A | 8/2014 |
| WO | 2008/132924 A1 | 11/2008 |
| WO | 2010/089808 A1 | 8/2010 |

OTHER PUBLICATIONS

Extended European Search Report dated Jul. 9, 2018 in European Patent Application No. 16836783.7.

\* cited by examiner

| ALLOCATION TIME (ms) | GPU ALLOCATION DELAY TIME (ms) | TAT (ms) |
|---|---|---|
| 0.01 | NULL | NULL |
| 0.02 | NULL | NULL |
| ...... | ...... | ...... |
| 0.20 | NULL | NULL |

| ALLOCATION TIME (ms) | CPU ALLOCATION DELAY TIME (ms) | TAT (ms) |
|---|---|---|
| 0.01 | 0.0040 | 0.5200 |
| 0.02 | 0.0038 | 0.5150 |
| ..... | ..... | ..... |
| 0.20 | 0.0010 | 0.4000 |

Fig. 11

| PRIORITY SECTION (ms) | CPU ALLOCATION DELAY TIME (ms) | TAT (ms) |
|---|---|---|
| 0.01 | NULL | NULL |
| 0.02 | NULL | NULL |
| ...... | ...... | ...... |
| 0.20 | NULL | NULL |

| PRIORITY SECTION (ms) | CPU ALLOCATION DELAY TIME (ms) | TAT (ms) |
|---|---|---|
| 0.01 | 0.0040 | 0.5200 |
| 0.02 | 0.0038 | 0.5150 |
| ..... | ..... | ..... |
| 0.20 | 0.0010 | 0.4000 |

212

VIRTUAL COMPUTER SYSTEM PERFORMANCE PREDICTION DEVICE, PERFORMANCE PREDICTION METHOD, AND PROGRAM STORAGE MEDIUM

CROSS REFERENCE TO RELATED APPLICATIONS

This application is a National Stage of International Application No. PCT/JP2016/003621 filed Aug. 5, 2016, claiming priority based on Japanese Patent Application No. 2015-161622 filed Aug. 19, 2015, the contents of all of which are incorporated herein by reference in their entirety.

TECHNICAL FIELD

The present invention relates to a technique to predict performance of a virtual computer system.

BACKGROUND ART

Development in computer virtualization technology has made it possible to operate a plurality of virtual machines in a single physical machine. Each of the virtual machines utilizes the hardware resources of the physical machine, such as a central processing unit (CPU), a memory, and an I/O device, in a time-division manner, so as to logically act as an individual computer.

In a virtual computer system, a CPU time allocated to each of the virtual machines is normally set based on a scheduling parameter. For example, as shown in FIG. 13, a deadline scheduler adopted in Linux (registered trademark) Kernel handles three parameters, namely runtime (CPU allocation time), period, and deadline, and secures the runtime before the deadline, in each period.

The following are some examples of techniques thus far proposed that are related to the present invention.

First, a method of predicting the performance of the virtual computer system has been proposed. For example, a performance prediction model is generated using a statistical processing or machine learning based on input values of the system and output values corresponding to the input values. Then, the performance of the virtual computer system is predicted based on the performance prediction model (see, for example, PTL 1). This technique is referred to as a first related art to the present invention. Specifically, the first related art predicts, on the assumption that a maximum number of threads in the virtual computer system is increased, the CPU usage, throughput, and turn around time (TAT) that may be outputted for the maximum number of threads.

In addition, a virtual computer configured to automatically adjust a CPU allocation time to be allocated to the virtual machine is proposed (see, for example, PTL 2), which will hereinafter be referred to as a second related art to the present invention. Specifically, the virtual computer sets a plurality of CPU allocation times to be allocated to the virtual machines, to sequentially allocate the CPU allocation time to each of the virtual machines, and measures a response time required for inputting and outputting through an external storage device or an I/O device, with respect to each of the CPU allocation times. The virtual computer identifies the optimum CPU allocation time for the virtual machine based on the variation of the measured response time dependent on the CPU allocation time, and applies the identified CPU allocation time.

CITATION LIST

Patent Literature

[PTL 1] Unexamined Japanese Patent Application Publication No. 2014-132419
[PTL 2] International Publication No. 2010/089808

SUMMARY OF INVENTION

Technical Problem

The virtual computer system configured to automatically adjust a CPU allocation time to be allocated to the virtual machine, as proposed in the second related art, is exceptional. In many of the known virtual computer systems, as mentioned above, the CPU time to be allocated to the virtual machine is determined based on the scheduling parameter. In such a virtual computer system, the user has to determine the scheduling parameter. However, the relationship between the scheduling parameter and the performance of the virtual machine is by no means simple, and therefore it is difficult for the user to estimate the relationship between the scheduling parameter and the performance of the virtual machine.

The present invention has been accomplished in view of the mentioned problem that it is difficult for the user to estimate the relationship between the scheduling parameter and the performance of the virtual machine, and provides a technique to predict the performance of the virtual computer system.

Solution to Problem

A performance prediction device according to an example embodiment of the present invention is a virtual computer system including a virtual machine that utilizes a physical machine having a central processing unit (CPU), and a scheduler that determines a CPU time to be allocated to the virtual machine based on a scheduling parameter.

The performance prediction device of the example embodiment includes:

a measurement unit that sets a sample value in the scheduling parameter and activates the virtual computer system and measures a CPU allocation delay time and a turn around time (TAT), the CPU allocation delay time being time from a time point that the virtual machine requests for allocation of the CPU to a time point that the CPU is allocated to the virtual machine, the TAT being time from a time point that a processing is requested to a time point that a processing result is outputted; and an estimation unit that generates an estimation formula based on a result of measurement with respect to the CPU allocation delay time and the TAT, the estimation formula including the scheduling parameter and the CPU allocation delay time as explanatory variables and an estimated TAT as an objective variable.

A performance prediction method according to an example embodiment of the present invention is a method for a virtual computer system including a virtual machine that utilizes a physical machine having a central processing unit (CPU), and a scheduler that determines a CPU time to be allocated to the virtual machine based on a scheduling parameter.

The performance prediction method of the example embodiment includes:

setting a sample value in the scheduling parameter and activating the virtual computer system and measuring a CPU allocation delay time and a turn around time (TAT), the CPU allocation delay time being time from a time point that the virtual machine requests for allocation of the CPU to a time point that the CPU is allocated to the virtual machine, the TAT being time from a time point that a processing is requested to a time point that a processing result is outputted; and generating an estimation formula based on a result of measurement with respect to the CPU allocation delay time and the TAT, the estimation formula including the scheduling parameter and the CPU allocation delay time as explanatory variables and an estimated TAT as an objective variable.

A program storage medium according to an example embodiment of the present invention stores a computer program executed by a computer connected to a virtual computer system including a virtual machine that utilizes a physical machine having a central processing unit (CPU) and a scheduler that determines a CPU time to be allocated to the virtual machine based on a scheduling parameter, the computer program cause the computer to perform:

setting a sample value in the scheduling parameter and activating the virtual computer system and measuring a CPU allocation delay time and a turn around time (TAT), the CPU allocation delay time being time from a time point that the virtual machine requests for allocation of the CPU to a time point that the CPU is allocated to the virtual machine, the TAT being time from a time point that a processing is requested to a time point that a processing result is outputted; and generating an estimation formula based on a result of measurement with respect to the CPU allocation delay time and the TAT, the estimation formula including the scheduling parameter and the CPU allocation delay time as explanatory variables and an estimated TAT as an objective variable.

Advantageous Effects of Invention

According to the present invention, the foregoing arrangements enable the user to easily estimate the relationship between the scheduling parameter and the performance of the virtual machine.

BRIEF DESCRIPTION OF DRAWINGS

FIG. 7 represents an example of a table used by the measurement unit according to the second example embodiment.

FIG. 8 represents a table showing another example of the measurement results by the measurement unit according to the second example embodiment.

FIG. 11 represents an example of the table used by the measurement unit according to the third example embodiment.

FIG. 12 represents a table showing another example of the measurement results by the measurement unit according to the third example embodiment.

DESCRIPTION OF EMBODIMENTS

Hereafter, example embodiments of the present invention will be described with reference to the drawings.

First Example Embodiment

Figure 1:
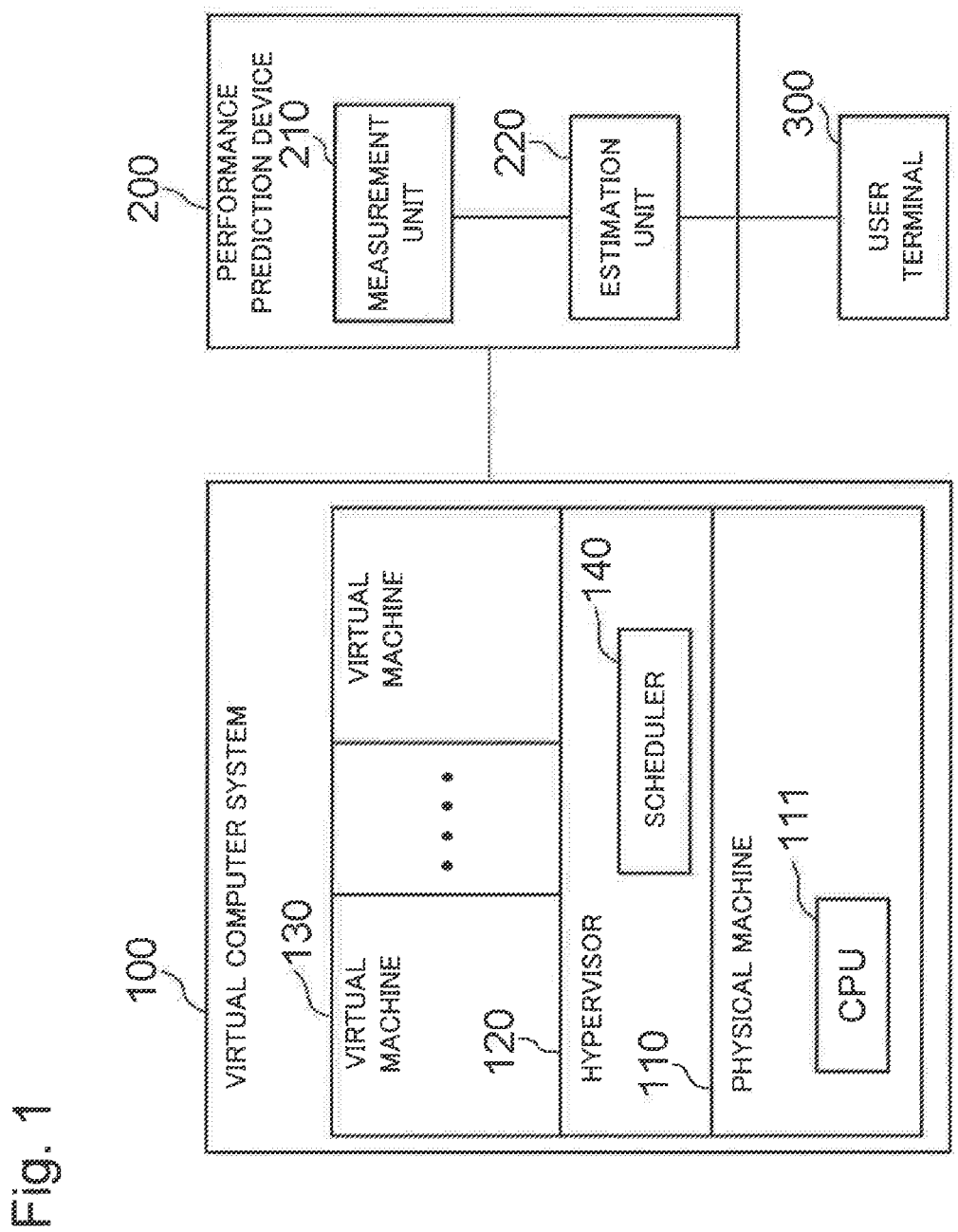
FIG. 1 is a block diagram showing a configuration of a virtual computer system according to a first example embodiment of the present invention.

Referring to FIG. 1, a performance prediction device 200 according to the first example embodiment of the present invention is connected to a virtual computer system 100 and a user terminal 300.

The virtual computer system 100 includes a physical machine 110. The physical machine 110 includes one or a plurality of CPUs 111, and non-illustrated hardware resources such as a memory and a network interface card (NIC). When the physical machine 110 executes a hypervisor 120 of being software, a plurality of virtual machines 130 is realized in the physical machine 110. Each of the virtual machines 130 is constructed in the physical machine 110, and activates a non-illustrated guest operation system (OS) and various application programs.

A CPU allocation time (CPU time) to be allocated to each of the virtual machines 130 in the virtual computer system 100 is controlled by a scheduler 140 included in the hypervisor 120. The scheduler 140 controls the CPU allocation time for each of the virtual machines 130 using a scheduling parameter of the corresponding virtual machine 130. The scheduling parameter of the virtual machine 130 can be specified by a user.

The performance prediction device 200 is, for example, constituted of an information processing device such as a personal computer. The performance prediction device 200 includes a measurement unit 210 and an estimation unit 220, as essential functional components.

The measurement unit 210 includes a function to set the scheduling parameter of the virtual machine 130 in the scheduler 140 of the virtual computer system 100. In addition, the measurement unit 210 includes a function to activate or turn off the virtual computer system 100, and measure a TAT of the virtual machine 130. Further, the measurement unit 210 includes a function to measure a CPU allocation delay time. The CPU allocation delay time is time from a time point that the virtual machine 130 is requested the allocation of the CPU 111 to a time point that the CPU 111 actually is allocated. The measurement unit 210 sets the scheduling parameter to be given to the virtual machine 130 to a predetermined sample value and activates the virtual computer system 100, and then measures the CPU allocation delay time and the TAT relevant to the virtual machine 130, utilizing the mentioned functions. The CPU allocation delay time refers to the time from the request of the CPU to the actual allocation of the CPU. The TAT refers to the time from a request for a processing to the output of the result of the processing. The measurement unit 210 repeats the series of such processings a plurality of times, changing the scheduling parameter each time.

The estimation unit 220 includes function to generate an estimation formula based on the measurement results provided by the measurement unit 210. The estimation formula is formula that includes the scheduling parameter and the CPU allocation delay time of the virtual machine 130 as explanatory variables, and the TAT of the virtual machine as an objective variable. In addition, the estimation unit 220 includes function to calculate the TAT based on the estimation formula generated, upon receipt of a request (inquiry) for the estimated value of the TAT from the user terminal 300, and return the calculation result to the user terminal 300. Thus, the request from the user terminal 300 includes information of a specified value designating the value of the scheduling parameter. The estimation unit 220 substitutes the specified value for the scheduling parameter in the estimation formula generated and calculates based on the estimation formula, to thereby estimate the TAT on the assumption that the scheduling parameter is the specified value. The estimation unit 220 returns the TAT estimated as above, to the user terminal 300.

The measurement unit 210 and the estimation unit 220 may be realized, for example, with a computer serving as the performance prediction device 200 and a program. The program may be stored in a computer-readable storage medium such as a magnetic disk device or a semiconductor memory, and read and executed by the computer, when the computer is activated. Through such an arrangement, the measurement unit 210 and the estimation unit 220 are realized in the computer.

Figure 2:
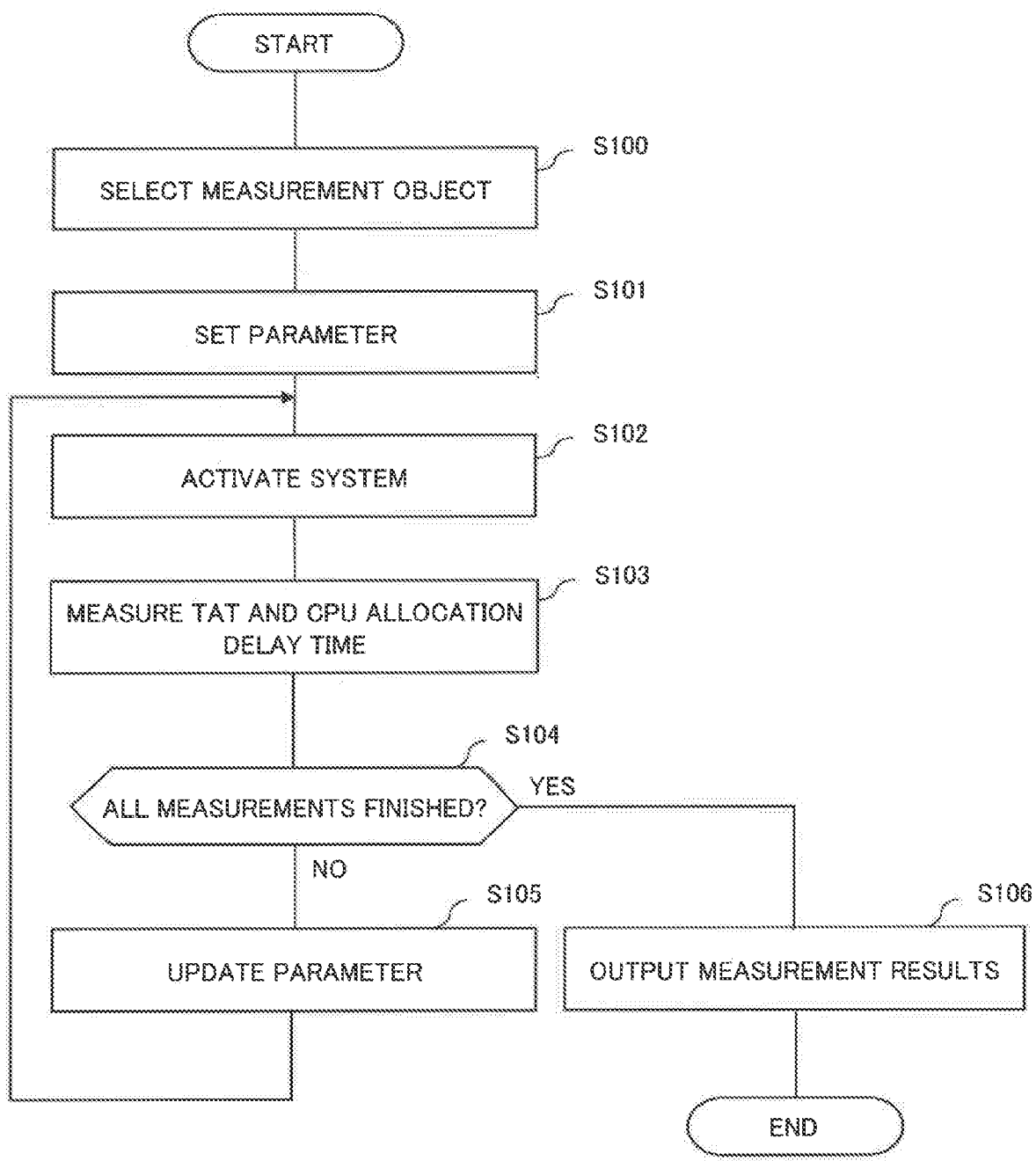
FIG. 2 is a flowchart showing an example of an operation of a measurement unit according to the first example embodiment.
Figure 3:
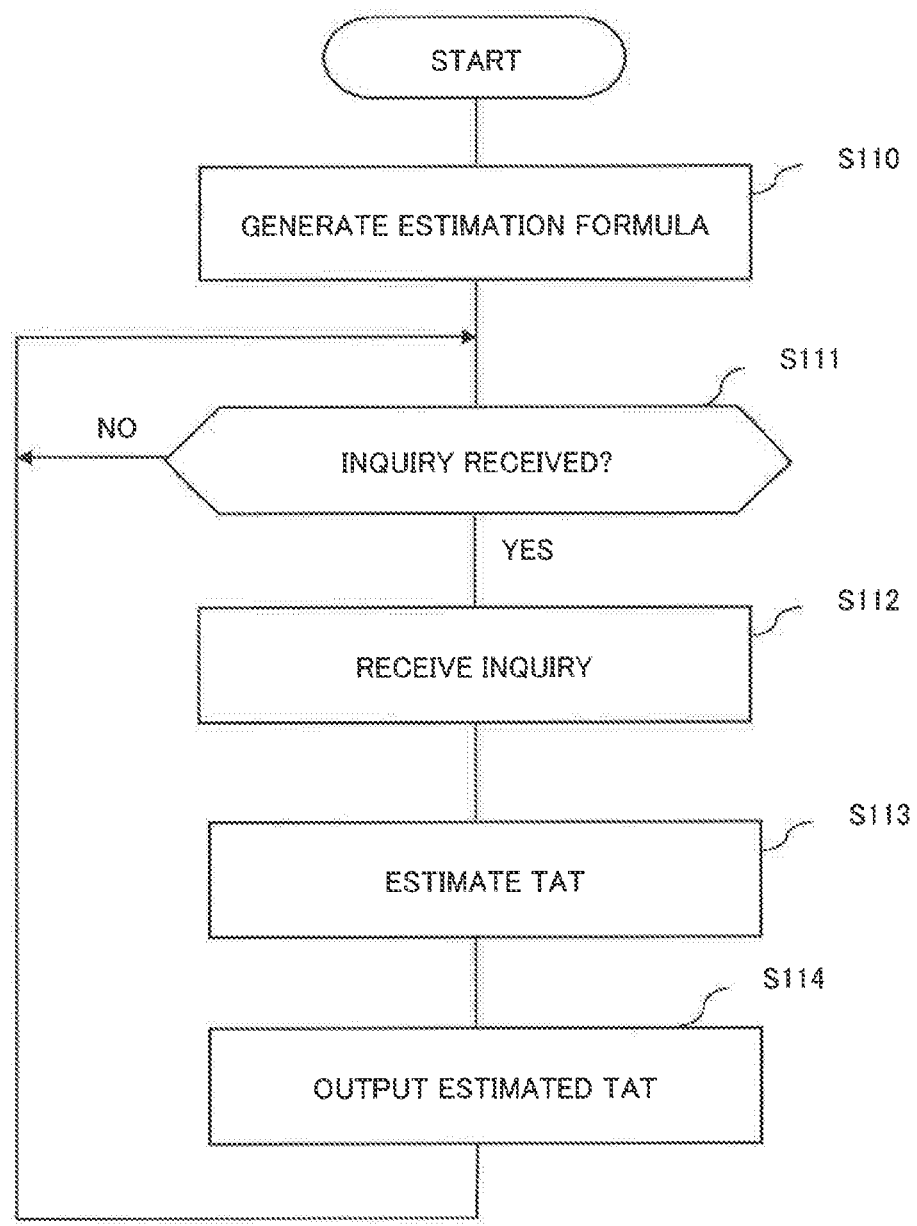
FIG. 3 is a flowchart showing an example of an operation of an estimation unit according to the first example embodiment.

FIG. 2 is a flowchart showing an operation of the measurement unit 210, and FIG. 3 is a flowchart showing an operation of the estimation unit 220. Referring to FIG. 1 to FIG. 3, an operation of the performance prediction device 200 according to the first example embodiment will be described hereunder.

To predict the performance of the virtual computer system 100 with the performance prediction device 200, first the measurement unit 210 is activated. That is, first, the measurement unit 210 selects one of the virtual machines 130 as a measurement object, out of the plurality of virtual machines in the virtual computer system 100 (step S100). The measurement unit 210 selects the virtual machine 130 as the measurement object, for example based on selection information of the virtual machine 130 received from the user terminal 300.

Then, the measurement unit 210 sets the scheduling parameter with respect to all of the virtual machines 130 of the virtual computer system 100 in the scheduler 140 included in the hypervisor 120 of the virtual computer system 100 (step S101). For example, with respect to the virtual machine 130 that is the measurement object, the measurement unit 210 sets a value selected out of a plurality of possible values of the scheduling parameter specified (designated) in the virtual machine 130 that is the measurement object. With respect to the virtual machines 130 other than the one that is the measurement object, the measurement unit 210 sets, for example, the scheduling parameter of a prefixed value for each of the virtual machines.

Then the measurement unit 210 instructs the virtual computer system 100 to start the operation (step S102). The measurement unit 210 then measures the TAT and the CPU allocation delay time of the virtual machine 130 that is the measurement object, while the virtual computer system 100 is in operation (step S103). The measurement unit 210 may measure the TAT and the CPU allocation delay time of the virtual machine that is the measurement object only once each, or a plurality of times and calculate the average value as the measurement results.

Thereafter, the measurement unit 210 checks whether the measurement of all the possible values of the scheduling parameter, specified for the virtual machine 130 that is the measurement object, has been finished (step S104). If the measurement has not been finished, the measurement unit 210 suspends the operation of the virtual computer system 100, and changes (updates) the value of the scheduling parameter for the virtual machine 130 that is the measurement object, to a value different from the value thus far specified (step S105). With respect to the virtual machines 130 other than the virtual machine 130 that is the measurement object, the same values set at step S101 are applied. The measurement unit 210 then returns to the processing step S102 and repeats the foregoing operation. Through the mentioned process, the measurement unit 210 measures the TAT and the CPU allocation delay time, with respect to each of the possible values of the scheduling parameter, for the virtual machine 130 that is the measurement object.

Upon finishing the measurement with respect to all of the possible values of the scheduling parameter for the virtual machine 130 that is the measurement object, the measurement unit 210 outputs the measurement results to the estimation unit 220 (step S106). Thus, the measurement unit 210 finishes the measurement process.

Referring now to FIG. 3, the estimation unit 220 generates the estimation formula based on the measurement results provided by the measurement unit 210, with respect to the virtual machine 130 that is the measurement object (step S110). The generated estimation formula includes the scheduling parameter and the CPU allocation delay time as the explanatory variables and the estimated TAT as the objective variable. Then the estimation unit 220 stands by for the request (inquiry) from the user terminal 300 (step S111).

When the user hopes to know the TAT that may be acquired by setting the scheduling parameter to a given value with respect to the virtual machine 130 that is the measurement object, the user transmits the request for the estimated TAT from the user terminal 300 to the estimation unit 220. The request includes the information of the value of the scheduling parameter. Upon receipt of the request (inquiry) from the user terminal 300 (i.e., the user) (step S112), the estimation unit 220 estimates the TAT using the estimation formula generated as above (step S113). The estimation unit 220 then outputs (returns) the estimated TAT to the user terminal 300 (step S114).

According to the first example embodiment, as described above, the user can easily recognize the relationship between the scheduling parameter and the performance of the virtual machine. This is because the measurement unit 210 of the performance prediction device 200 measures the CPU allocation delay time and the TAT of the virtual machine 130 of being the measurement object with respect to each of the possible values of the scheduling parameter, and generates the estimation formula for estimating the TAT by using the measurement results.

Second Example Embodiment

As a second example embodiment, further details of the performance prediction device 200 according to the first example embodiment will be described.

Figure 4:
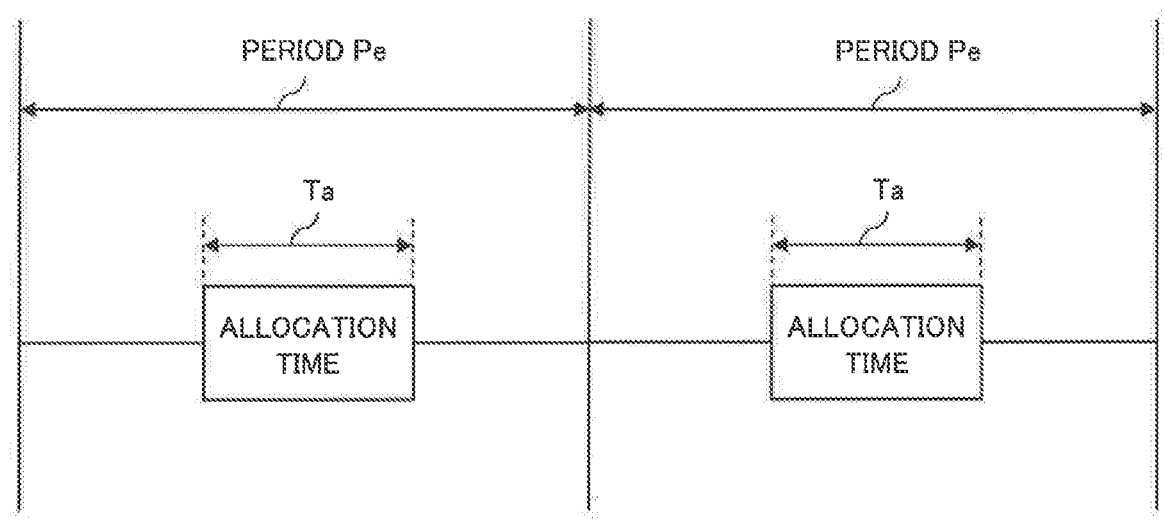
FIG. 4 is a diagram for explaining a scheduling parameter set by a scheduler in a virtual machine according to a second example embodiment of the present invention.

FIG. 4 is a diagram for explaining the scheduling parameter set by the scheduler 140 in the virtual machine 130 according to the second example embodiment. The scheduler 140 shown in FIG. 4 sets two scheduling parameters, namely a period Pe and an allocation time Ta, in the virtual machine 130. Then the scheduler 140 allocates the CPU time to the virtual machine 130 according to the set scheduling parameters. More specifically, the scheduler 140 allows the virtual machine 130 to use the CPU during the time Ta designated as the allocation time in the period Pe designated as the period.

Figure 5:
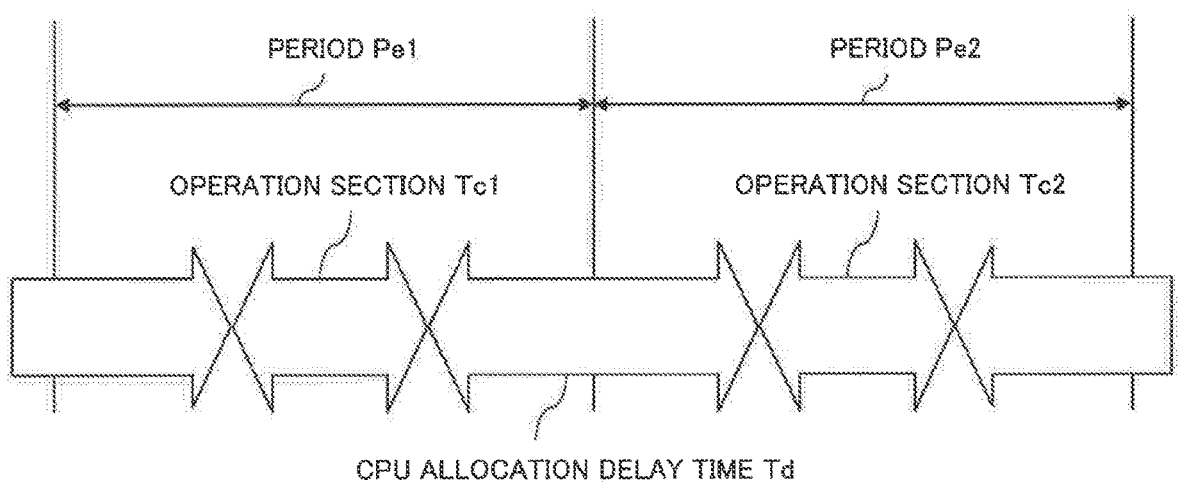
FIG. 5 is a diagram for explaining a CPU allocation delay time measured by a measurement unit according to the second example embodiment of the present invention.

FIG. 5 is a diagram for explaining the CPU allocation delay time measured by the measurement unit 210 according to the second example embodiment. It is assumed that, as shown in FIG. 5, the CPU time corresponding to an operation section Tc1 is allocated to the virtual machine 130 in a period Pe1, and the CPU time corresponding to an operation section Tc2 is allocated in a following period Pe2. In this case, the time between the ending time of the operation section Tc1 and the starting time of the next operation section Tc2 is defined as the CPU allocation delay time Td in the second example embodiment.

When the virtual computer system 100 utilizes, for example, Red Hat Enterprise Linux (registered trademark), the measurement unit 210 can measure the CPU allocation delay time Td, for example using a function called ftrace of Linux (registered trademark). More specifically, the measurement unit 210 detects the ending time of the operation section Tc1 and the starting time of the next operation section Tc2, both allocated to the virtual machine 130, using the ftrace function, and calculates the time difference between the ending time and the starting time.

Figure 6:
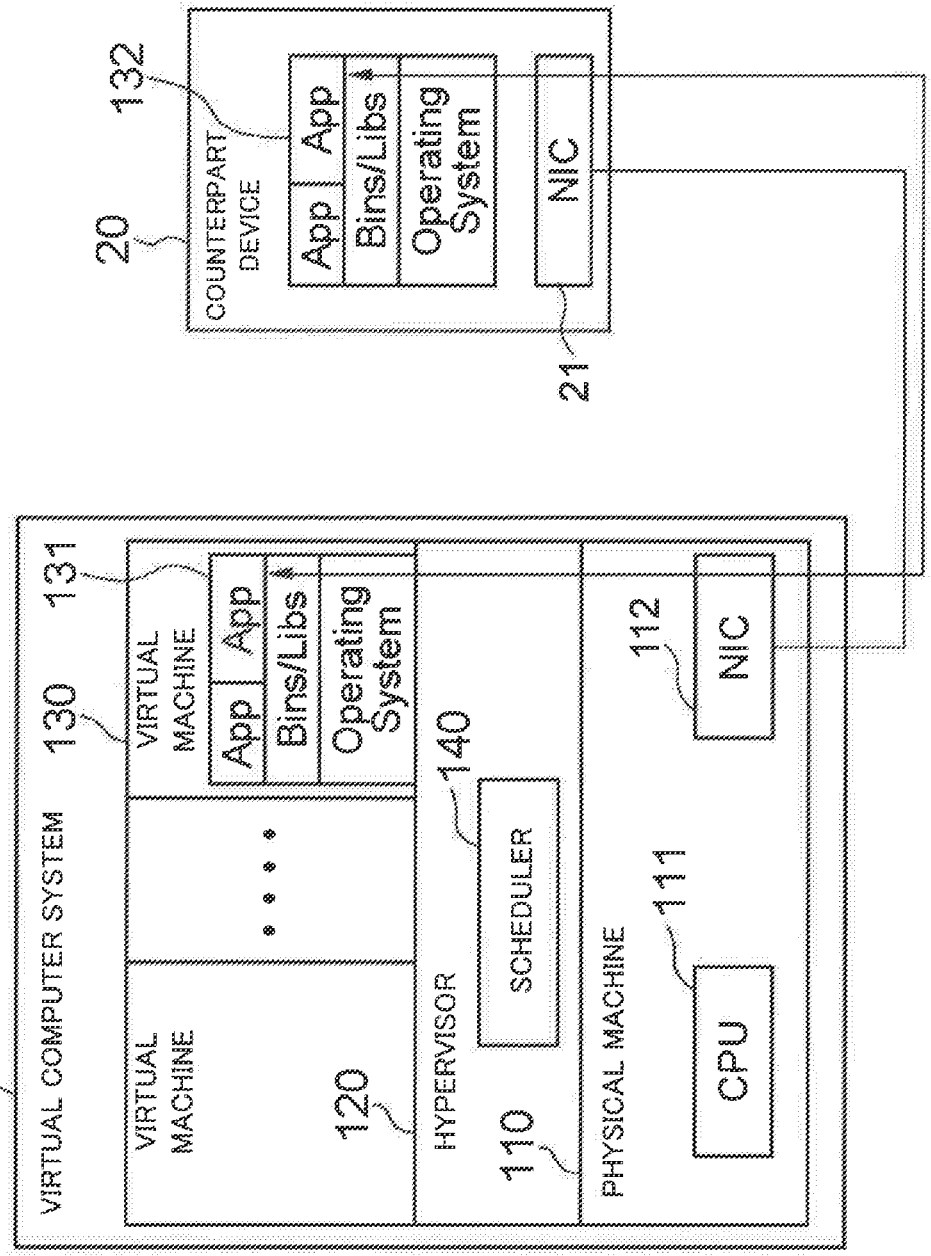
FIG. 6 is a schematic diagram showing a specific example of the measurement of the CPU allocation delay time and TAT of the virtual machine by the measurement unit according to the second example embodiment.

FIG. 6 is a schematic diagram showing an example of the configuration of the system in which the measurement unit 210 according to the second example embodiment measures the CPU allocation delay time and the TAT of the virtual machine 130. As shown in FIG. 6, the virtual computer system 100 in which the plurality of virtual machines 130 operate, and a counterpart device (information processing device) 20 are connected to each other via a NIC 21, a NIC 112, and a network. A plurality of application programs is in operation, in the virtual machine 130 that is the measurement object and the counterpart device 20. Here, it is assumed that one of the application programs (APP) 131 operating in the virtual machine 130 has transmitted a request to one of the application programs (APP) 132 operating in the counterpart device 20. Upon receipt of the request, the application program 132 processes the request, and transmits (returns) the processing result, as a response, to the application program 131. The measurement unit 210 measures the time from the transmission of the request by the application program 131 to the reception of the request, as the TAT of the virtual machine 130. The measurement unit 210 also measures the CPU allocation delay time of the virtual machine 130.

FIG. 7 represents an example of a table used by the measurement unit 210 according to the second example embodiment. The table 211 contains a plurality of entries in which the allocation time, the CPU allocation delay time, and the TAT are associated with one another. In the column of the allocation time, values are provided in advance. In this example, specifically, the allocation times are provided in increments of 0.01 ms between 0.01 ms and 0.20 ms on the assumption that the allocation time that can be set in the scheduler 140 is in the range of 0.01 ms to 0.20 ms. In the initial state, NULL is provided in the columns of the CPU allocation delay time and the TAT.

Under the system configuration shown in FIG. 6, the measurement unit 210 measures the TAT and the CPU allocation delay time of the virtual machine 130 that is the measurement object, and updates the columns of the CPU allocation delay time and the TAT in the table 211 shown in FIG. 7 to the values according to the measurement results.

More specifically, the measurement unit 210 sets the allocation time of 0.01 ms in the first line of the table 211, as the allocation time Ta for the virtual machine 130 in the scheduler 140, at step S101 in FIG. 2. The predetermined values (fixed values) are set as the period Pe, which is the remaining scheduling parameter of the virtual machine 130 that is the measurement object, and as the scheduling parameter of the virtual machines 130 other than the virtual machine 130 that is the measurement object. Thereafter, the measurement unit 210 activates the virtual computer system 100 (step S102). The measurement unit 210 then measures the CPU allocation delay time and the TAT of the virtual machine 130 a plurality of times, and updates the columns of the CPU allocation delay time and the TAT in the first line of the table 211 according to the measurement results determined by calculating the average of the measured values (step S103).

At step S105 in FIG. 2, the measurement unit 210 sets the allocation time of 0.02 ms in the second line of the table 211 as the allocation time Ta for the virtual machine 130 in the scheduler 140 with the virtual computer system 100 set to a stopped state. At this point, the period Pe, which is the remaining scheduling parameter of the virtual machine 130 that is the measurement object, and the scheduling parameter of the virtual machines 130 other than the virtual machine 130 that is the measurement object are maintained at the predetermined values. Then, the measurement unit 210 reactivates the virtual computer system 100 (step S102). The measurement unit 210 then measures the CPU allocation delay time and the TAT of the virtual machine 130 a plurality of times, and updates the columns of the CPU allocation delay time and the TAT in the second line of the table 211 according to the measurement results determined by calculating the average of the measured values (step S103).

The measurement unit 210 repeats the mentioned operation and updates the columns of the CPU allocation delay time and the TAT of all entries in the table 211 shown in FIG. 7 to the values according to the measurement results. Then the measurement unit 210 outputs the table 211 to the estimation unit 220 (step S106).

FIG. 8 represents an example of the table 211 outputted from the measurement unit 210. The columns of the CPU allocation delay time and the TAT, in which NULL is entered in FIG. 7, are updated to the values according to the measurement results.

For example, the estimation formula used by the estimation unit 220 may be expressed as the following equation (1) which may hereinafter be referred to as estimation formula S.

$$\text{Estimated TAT} = A \times \text{CPU allocation delay time} + B \times \text{scheduling parameter} + C \quad \text{Equation (1)}$$

In the estimation formula S, A, B, and C are coefficients. The estimation formula S represents that the estimated TAT can be obtained by summing the CPU allocation delay time multiplied by A, the scheduling parameter multiplied by B, and the coefficient C. Here, the scheduling parameter in the estimation formula S is the allocation time Ta in the second example embodiment. The remaining scheduling parameter, namely the period Pe, is the predetermined value (fixed value) in the second example embodiment.

The estimation unit 220 determines, for example by regression analysis, the values of the coefficients A, B, and C in the estimation formula S that accord with the measurement results in the table shown in FIG. 8 inputted by the measurement unit 210, and completes the estimation formula S.

The estimation formula S completed by the estimation unit 220 may be expressed, for example, as the following equation (2) which may hereinafter be referred to as estimation formula R.

$$\text{Estimated TAT} = 30 \times \text{CPU allocation delay time} + 0.5 \times \text{scheduling parameter} + 0.4 \quad \text{Equation (2)}$$

In this example, the coefficients A, B, and C in the estimation formula S are determined as coefficient A=30, coefficient B=0.5, and coefficient C=0.4. Note that such specific values of the coefficients are merely examples, adopted for convenience sake.

The estimation unit 220 responds to the request for the estimated TAT from the user terminal 300 utilizing the estimation formula R completed as above. For example, in the case where the request for the estimated TAT, to be obtained when the user designates the allocation time Ta of 0.01, is received from the user terminal 300, the estimation unit 220 calculates the estimated TAT as follows.

First, the estimation unit 220 acquires the CPU allocation delay time corresponding to the designated allocation time Ta of 0.01 from the table 211 shown in FIG. 8. According to FIG. 8, the CPU allocation delay time corresponding to the allocation time Ta of 0.01 is 0.0040 as entered in the first line of the table 211. Then the estimation unit 220 substitutes 0.0040 for the CPU allocation delay time, and 0.01 for the scheduling parameter, in the right side of the estimation formula R, to thereby the estimated TAT as 0.525.

Then the estimation unit 220 outputs (transmits) the estimated TAT calculated as above to the user terminal 300 as the response to the request.

In the second example embodiment, out of the two scheduling parameters, namely the period Pe and the allocation time Ta, the period Pe is fixed, and the allocation time Ta and the CPU allocation delay time are used as the explanatory variables of the estimation formula S. Instead, as a variation of the second example embodiment, the allocation time Ta may be fixed, and the period Pe and the CPU allocation delay time may be used as the explanatory variables of the estimation formula S. Alternatively, as another variation of the second example embodiment, the period Pe, the allocation time Ta, and the CPU allocation delay time may be used as the explanatory variables of the estimation formula S. In this case, the column of the period is added to the entry of the table 211 shown in FIG. 7 and FIG. 8. In addition, the measurement unit 210 measures the CPU allocation delay time and the TAT with respect to each combination of the period and the allocation time.

Although the estimation formulas S and R for calculating the estimated TAT are linear sum formulas composed of the CPU allocation delay time, the scheduling parameter and the constant, in the second example embodiment, the estimation formula for calculating the estimated TAT may be, for example, a square sum formula, without limitation to the linear sum formula.

Third Example Embodiment

As a third example embodiment, further details of the performance prediction device 200 according to the first example embodiment will be described.

Figure 9:
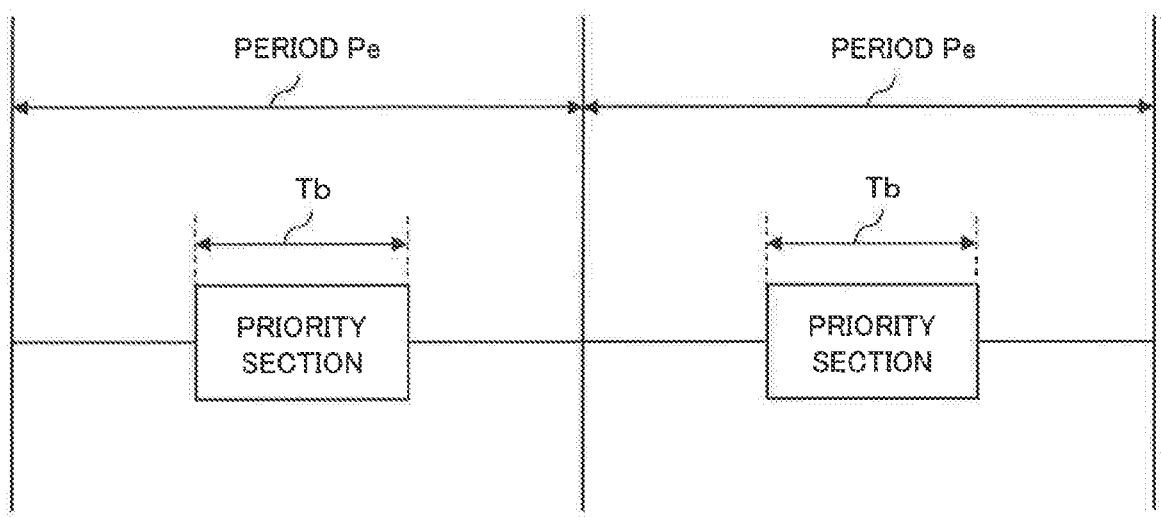
FIG. 9 is a diagram for explaining a scheduling parameter set by a scheduler in a virtual machine according to a third example embodiment of the present invention.

FIG. 9 is a diagram for explaining the scheduling parameter set by the scheduler 140 in the virtual machine 130 according to a third example embodiment. In this example, two scheduling parameters, namely the period Pe and a priority section Tb, are set for the virtual machine 130 in the scheduler 140. Then the scheduler 140 allocates the CPU time to the virtual machine 130 based on the scheduling parameter set as above. Here, the priority section Tb represents a combined concept of the deadline and the runtime of the deadline scheduler. To be more detailed, the deadline is a time limit determined based on the elapsed time from a base point corresponding to the starting point of the period Pe. However, the priority section Tb represents a concept of allocating a time that the virtual machine 130 assumes to be necessary for the processing to the virtual machine 130 as the CPU allocation time (i.e., runtime) within the section corresponding to the period Pe, free from the limitation of the position of the base point. Thus, the priority section Tb differs from the deadline in that the position of the base point is not limited provided that the base point is within the section of the period Pe. In addition, priority section Tb differs from the runtime in that the CPU is not always allocated. In other words, the priority section Tb plays two roles, despite apparently being a single parameter. Therefore, when the priority section Tb is set as a parameter, a parameter that serves as the deadline and a parameter that serves as the runtime are not set.

Figure 10:
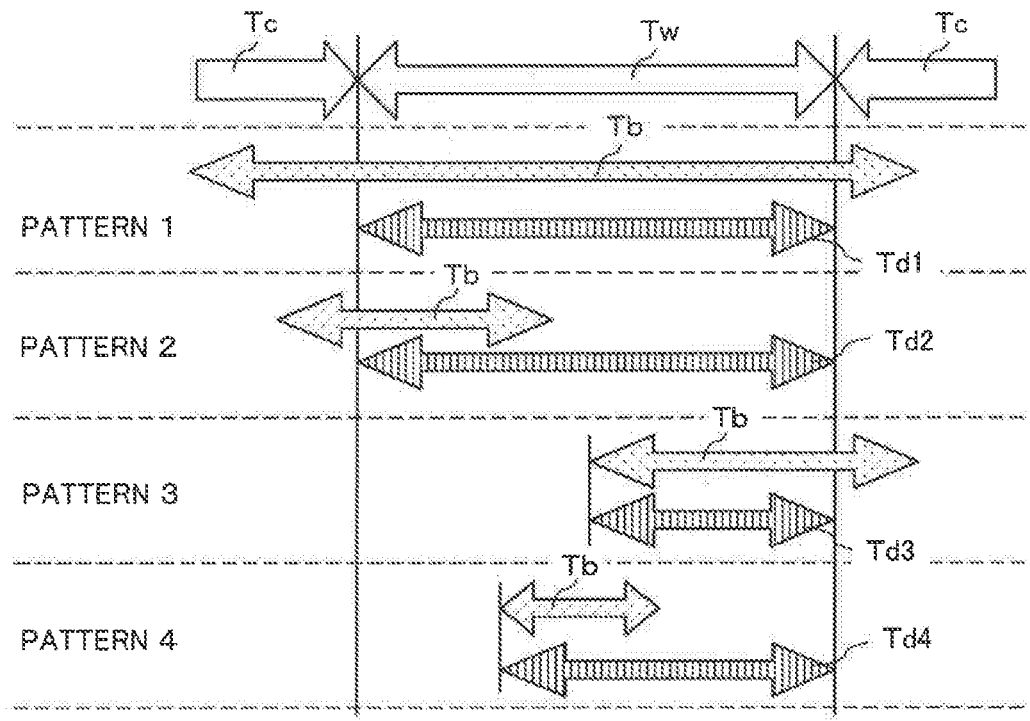
FIG. 10 is a diagram for explaining a CPU allocation delay time measured by a measurement unit according to the third example embodiment of the present invention.
Figure 10:
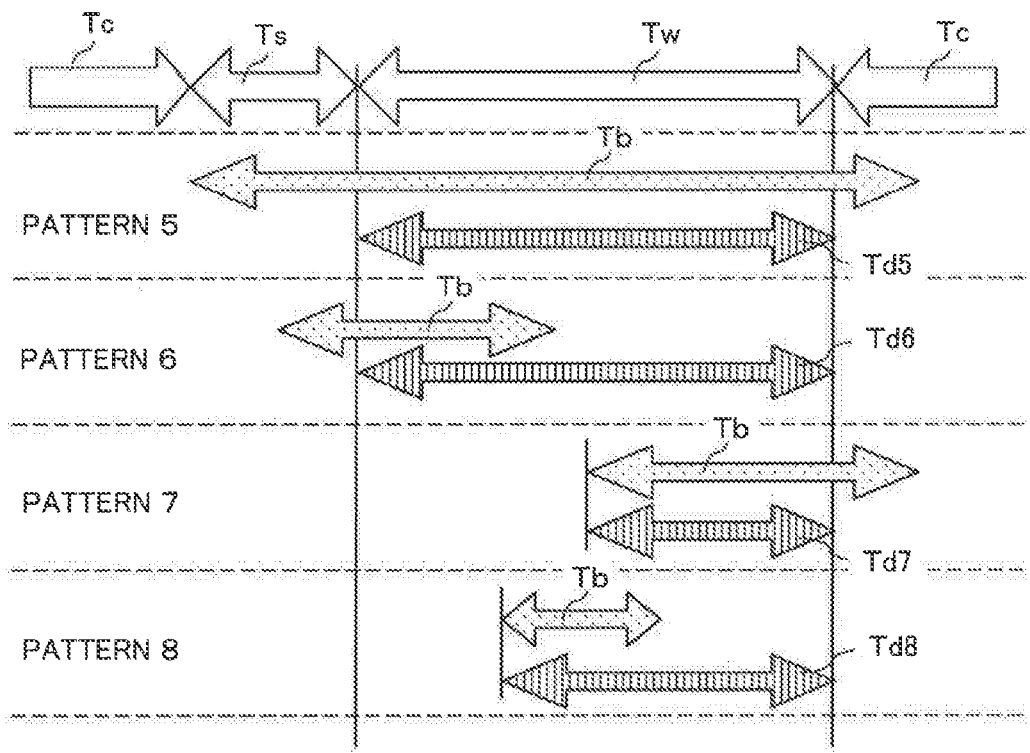
Figure 13:
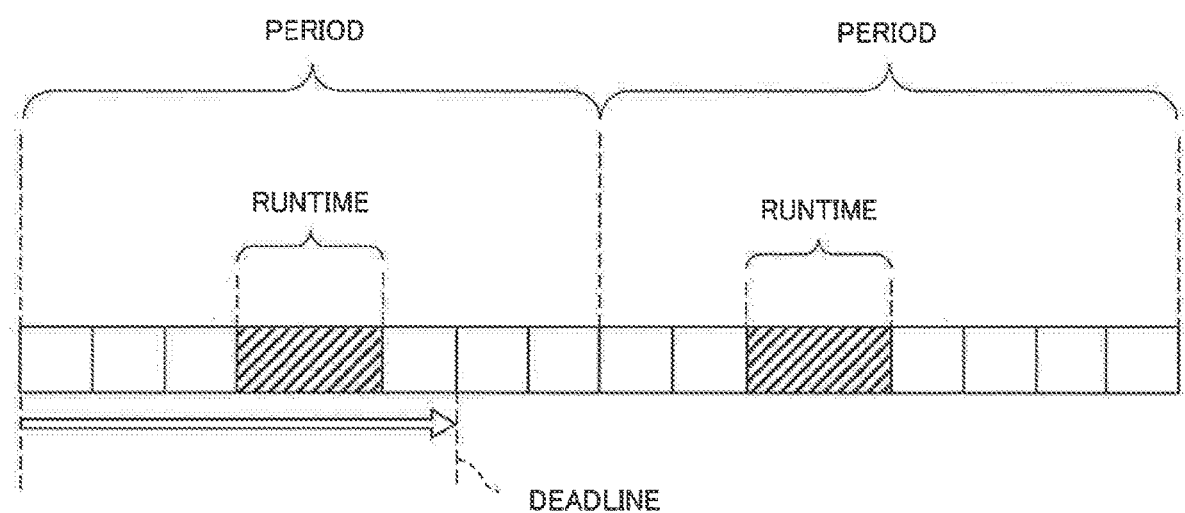
FIG. 13 is a diagram for explaining scheduling parameters handled by a deadline scheduler.

FIG. 10 is a diagram for explaining the CPU allocation delay time measured by the measurement unit 210 according to the third example embodiment. Referring to FIG. 10, a CPU allocation standby section Tw corresponds to the time from a time point that the virtual machine 130 has requested the allocation of the CPU to a time point that the CPU is actually allocated. The operation section Tc corresponds to the time when the virtual machine is actually in operation with the CPU allocated thereto. Further, each of times represented by arrows denoted by Td1 to Td8 corresponds to the CPU allocation delay time Td measured by the measurement unit 210 according to the third example embodiment. In addition, the times represented by arrows denoted by Tb each correspond to the priority section.

In the third example embodiment, the CPU allocation delay time Td corresponds to the time from a time point that the priority section Tb has entered the CPU allocation standby section Tw to the starting point of the operation section Tc where the CPU is actually allocated to the virtual machine 130. Thus, the CPU allocation delay time Td referred to above corresponds to the time when the virtual machine 130 is waiting for the allocation of the CPU, despite that this period is specified by the design as the priority section Tb, in which the virtual machine 130 is allowed to use the CPU with priority. The CPU allocation delay time Td may vary in eight patterns which are denoted by a pattern 1 to a pattern 8 shown in FIG. 10 depending on the difference in setting of the priority section Tb and whether a sleep mode is set. In other words, it may be assumed that the state of the CPU viewed from the side of the virtual machine 130 includes the following states (1) to (4), and the time from a time point that the state (2) has been reached to a time point that the state (4) has been reached corresponds to the CPU allocation delay time Td.

State (1): CPU is unnecessary

State (2): CPU is necessary but not yet allocated, but to be allocated with priority State (3): CPU is necessary but not yet allocated, and not to be allocated with priority State (4): CPU is allocated When the virtual computer system 100 utilizes Red Hat Enterprise Linux (registered trademark), the measurement unit 210 can measure the CPU allocation delay time Tb, for example using the function called ftrace of Linux (registered trademark).

In the third example embodiment, the measurement unit 210 measures the CPU allocation delay time Td and the TAT of the virtual machine 130 under the same system configuration as FIG. 6.

FIG. 11 represents an example of a table used by the measurement unit 210 according to the third example embodiment. The table 212 contains a plurality of entries in which the priority section, the CPU allocation delay time, and the TAT are associated with one another. In the column of the priority section, values are provided in advance. In this example, specifically, the priority sections are provided in increments of 0.01 ms between 0.01 ms and 0.20 ms on the assumption that the priority section that can be set in the scheduler 140 is in the range of 0.01 ms to 0.20 ms. In the initial state, NULL is provided in the columns of the CPU allocation delay time and the TAT.

Under the system configuration shown in FIG. 6, the measurement unit 210 measures, the TAT and the CPU allocation delay time Td of the virtual machine 130 that is the measurement object and updates the columns of the CPU allocation delay time and the TAT in the table 212 shown in FIG. 11 to the values according to the measurement results.

More specifically, the measurement unit 210 sets the priority section of 0.01 ms in the first line of the table 212 as the priority section Tb for the virtual machine 130 in the scheduler 140, at step S101 in FIG. 2. The predetermined values (fixed values) are set as the period Pe, which is the remaining scheduling parameter of the virtual machine 130 that is the measurement object, and as the scheduling parameter of the virtual machines 130 other than the virtual machine 130 that is the measurement object. Thereafter, the measurement unit 210 activates the virtual computer system 100 (step S102), and measures the CPU allocation delay time Td defined as above and the TAT of the virtual machine 130 a plurality of times. Then the measurement unit 210 updates the columns of the CPU allocation delay time and the TAT in the first line of the table 212 to the average values of the measurement results (step S103).

At step S105 in FIG. 2, the measurement unit 210 sets the priority section of 0.02 ms in the second line of the table 212 as the priority section Tb for the virtual machine 130 in the scheduler 140, and maintains the period Pe, which is the remaining scheduling parameter of the virtual machine 130 that is the measurement object, and the scheduling parameter of the virtual machines 130 other than the virtual machine 130 that is the measurement object, at the predetermined values. Then, the measurement unit 210 reactivates the virtual computer system 100 (step S102). The measurement unit 210 then measures the CPU allocation delay time and the TAT of the virtual machine 130 a plurality of times, and updates the columns of the CPU allocation delay time and the TAT in the second line of the table 212 to the average values of the measurement results (step S103).

The measurement unit 210 repeats the mentioned operation to update all the columns of the CPU allocation delay time and the TAT in the table 212 shown in FIG. 11 to the values according to the measurement results. Then the measurement unit 210 outputs the table 212 to the estimation unit 220 (step S106).

FIG. 12 represents an example of the table 212 outputted by the measurement unit 210. All the columns of the CPU allocation delay time and the TAT, in which NULL is entered in FIG. 11, have been updated to the values according to the measurement results.

In the third example embodiment, the estimation unit 220 utilizes the estimation formula S, as in the second example embodiment. Here, the scheduling parameter in the estimation formula S is the priority section Tb, in the third example embodiment. The remaining scheduling parameter, namely the period Pe, is the predetermined value (fixed value), in the third example embodiment.

The estimation unit 220 determines, for example by regression analysis, the values of the coefficients A, B, and C in the estimation formula S that accord with the measurement results in the table shown in FIG. 12 inputted by the measurement unit 210, and completes the estimation formula S. The description given hereunder is based on the assumption that the estimation formula R determined (generated) by the estimation unit 220 is the same as that of the second example embodiment.

The estimation unit 220 responds to the request for the estimated TAT from the user terminal 300 utilizing the generated estimation formula R. For example, when the request for the estimated TAT received from the user terminal 300 is based on the user's designation of the priority section Tb of 0.01, the estimation unit 220 calculates the estimated TAT as follows.

First, the estimation unit 220 acquires the CPU allocation delay time corresponding to the designated priority section Tb of 0.01 from the table 212 shown in FIG. 12. According to FIG. 12, the CPU allocation delay time corresponding to the priority section Tb of 0.01 is 0.0040 as entered in the first line of the table 212. Then the estimation unit 220 substitutes 0.0040 for the CPU allocation delay time, and 0.01 for the scheduling parameter, in the right side of the estimation formula R, and thereby obtains the estimated TAT as 0.525.

Then the estimation unit 220 outputs (transmits) the estimated TAT calculated as above, to the user terminal 300, as the response to the request.

In the third example embodiment, out of the two scheduling parameters, namely the period Pe and the priority section Tb, the period Pe is fixed, and the priority section Tb and the CPU allocation delay time Tb are used as the explanatory variables of the estimation formula S. Instead, as a variation of the third example embodiment, the priority section Tb may be fixed, and the period Pe and the CPU allocation delay time Td may be used as the explanatory variables of the estimation formula S. Alternatively, as another variation of the third example embodiment, the period Pe, the priority section Tb, and the CPU allocation delay time Td may be used as the explanatory variables of the estimation formula S. In this case, the column of the period is added to the entry of the table 212 shown in FIG. 11 and FIG. 12, and the measurement unit 210 measures the CPU allocation delay time and the TAT, with respect to each combination of the period and the priority section.

Although the estimation formulas S and R for calculating the estimated TAT are linear sum formulas composed of the CPU allocation delay time, the scheduling parameter and the constant, in the third example embodiment, the estimation formula for calculating the estimated TAT may be, for example, a square sum formula, without limitation to the linear sum formula.

Although the present invention has been described as above with reference to some example embodiments, the present invention is not limited to the foregoing example embodiments, but may be modified in various manners. For example, the deadline scheduler employed in Linux (registered trademark) Kernel may be utilized as the scheduler 140. In this case, an estimation formula including one, two, or all of the three parameters, namely the runtime, the period, and the deadline, and the CPU allocation delay time as the explanatory variables, and the estimated TAT as the objective variable, may be used for the calculation.

In the foregoing example embodiments, the estimation unit 220 utilizes the estimation formula S to estimate the TAT from the scheduling parameter. However, the estimation unit 220 may determine the value of the scheduling parameter necessary for estimating the TAT, using the estimation formula S.

The present invention is thus far described with reference to the foregoing example embodiments. However, the present invention is not limited to the foregoing example embodiments. Various configurations that are apparent to those skilled in the art may be applied to the present invention, within the scope of the present invention.

INDUSTRIAL APPLICABILITY

The present invention is applicable to situations where a relationship between TAT and a scheduling parameter of a virtual machine is estimated in a virtual computer system including a scheduler that allocates a CPU time to the virtual machine based on the scheduling parameter set by a user. For example, the present invention is applicable to a system for securing an upper limit of the TAT according to Service Level Agreement (SLA).

REFERENCE SIGNS LIST

- 100 virtual computer system
- 110 physical machine
- 111 CPU
- 120 hypervisor
- 130 virtual machine
- 140 scheduler
- 200 performance prediction device
- 210 measurement unit
- 211, 212 table
- 220 estimation unit
- 300 user terminal

The invention claimed is:

1. A performance prediction device for a virtual computer system including a virtual machine that utilizes a physical machine having a central processing unit (CPU), and a scheduler that determines a CPU time to be allocated to the virtual machine based on a scheduling parameter, the performance prediction device comprising:
   a processor that is configured to:
   set a sample value in the scheduling parameter and activate the virtual computer system and measure a CPU allocation delay time and a turn around time (TAT), the CPU allocation delay time being time from a time point that the virtual machine requests for allocation of the CPU to a time point that the CPU is allocated to the virtual machine, the TAT being time from a time point that a processing is requested to a time point that a processing result is outputted; and
   generate an estimation formula based on a result of measurement with respect to the CPU allocation delay time and the TAT, the estimation formula including the scheduling parameter and the CPU allocation delay time as explanatory variables and an estimated TAT as an objective variable,
   wherein, when an request for the estimated TAT to be obtained when a value of the scheduling parameter is designated is received from a user terminal, the processor calculates the estimated TAT based on the scheduling parameter designated and the estimation formula generated and returns the estimated TAT calculated to the user terminal, and
   wherein the processor generates and retains data in which a value of the scheduling parameter and the CPU allocation delay time are associated with each other based on measurement results of the CPU allocation delay time and the TAT, and, upon receipt of the request, acquires the CPU allocation delay time associated with the value of the scheduling parameter designated from the data, and calculates the estimated TAT by substituting the CPU allocation delay time acquired and the designated value of scheduling parameter in the estimation formula.

2. The performance prediction device of claim 1, wherein the processor is further configured to secure an upper limit of the TAT according to Service Level Agreement (SLA) based on the estimated TAT.

3. A performance prediction device for a virtual computer system including a virtual machine that utilizes a physical machine having a central processing unit (CPU), and a scheduler that determines a CPU time to be allocated to the virtual machine based on a scheduling parameter, the performance prediction device comprising:
   a processor that is configured to:
   set a sample value in the scheduling parameter and activate the virtual computer system and measure a CPU allocation delay time and a turn around time (TAT), the CPU allocation delay time being time from a time point that the virtual machine requests for allocation of the CPU to a time point that the CPU is allocated to the virtual machine, the TAT being time from a time point that a processing is requested to a time point that a processing result is outputted; and
   generate an estimation formula based on a result of measurement with respect to the CPU allocation delay time and the TAT, the estimation formula including the scheduling parameter and the CPU allocation delay time as explanatory variables and an estimated TAT as an objective variable,
   wherein the processor utilizes the estimation formula expressed as:

$$TAT = A \times \text{delay time} + B \times \text{scheduling parameter} + C,$$

where A, B, and C are coefficients, and
   determines the coefficients A, B, and C based on the measurement results of the CPU allocation delay time and the TAT.

4. The performance prediction device of claim 3, wherein the processor is further configured to secure an upper limit of the TAT according to Service Level Agreement (SLA) based on the estimated TAT.

5. A performance prediction method for a virtual computer system including a virtual machine that utilizes a physical machine having a central processing unit (CPU), and a scheduler that determines a CPU time to be allocated to the virtual machine based on a scheduling parameter, the performance prediction method comprising:

by processor, setting a sample value in the scheduling parameter and activating the virtual computer system and measuring a CPU allocation delay time and a turn around time (TAT), the CPU allocation delay time being time from a time point that the virtual machine requests for allocation of the CPU to a time point that the CPU is allocated to the virtual machine, the TAT being time from a time point that a processing is requested to a time point that a processing result is outputted; and generating an estimation formula based on a result of measurement with respect to the CPU allocation delay time and the TAT, the estimation formula including the scheduling parameter and the CPU allocation delay time as explanatory variables and an estimated TAT as an objective variable wherein the processor generates and retains data in which a value of the scheduling parameter and the CPU allocation delay time are associated with each other based on measurement results of the CPU allocation delay time and the TAT, and, upon receipt of the request, acquires the CPU allocation delay time associated with the value of the scheduling parameter designated from the data, and calculates the estimated TAT by substituting the CPU allocation delay time acquired and the designated value of scheduling parameter in the estimation formula.

6. The performance prediction method of claim 5, further comprising securing an upper limit of the TAT according to Service Level Agreement (SLA) based on the estimated TAT.

7. A non-transitory program storage medium storing a computer program, the computer program executed by a computer connected to a virtual computer system including a virtual machine that utilizes a physical machine having a central processing unit (CPU) and a scheduler that determines a CPU time to be allocated to the virtual machine based on a scheduling parameter, the computer program cause the computer to perform:

setting a sample value in the scheduling parameter and activating the virtual computer system and measuring a CPU allocation delay time and a turn around time (TAT), the CPU allocation delay time being time from a time point that the virtual machine requests for allocation of the CPU to a time point that the CPU is allocated to the virtual machine, the TAT being time from a time point that a processing is requested to a time point that a processing result is outputted; and generating an estimation formula based on a result of measurement with respect to the CPU allocation delay time and the TAT, the estimation formula including the scheduling parameter and the CPU allocation delay time as explanatory variables and an estimated TAT as an objective variable, wherein the computer program cause the computer to perform generating and retaining data in which a value of the scheduling parameter and the CPU allocation delay time are associated with each other based on measurement results of the CPU allocation delay time and the TAT, and, upon receipt of the request, acquires the CPU allocation delay time associated with the value of the scheduling parameter designated from the data, and calculating the estimated TAT by substituting the CPU allocation delay time acquired and the designated value of scheduling parameter in the estimation formula.

8. The non-transitory program storage medium of claim 7, further comprising securing an upper limit of the TAT according to Service Level Agreement (SLA) based on the estimated TAT.

9. A performance prediction method for a virtual computer system including a virtual machine that utilizes a physical machine having a central processing unit (CPU), and a scheduler that determines a CPU time to be allocated to the virtual machine based on a scheduling parameter, the performance prediction method comprising:

by processor, setting a sample value in the scheduling parameter and activating the virtual computer system and measuring a CPU allocation delay time and a turn around time (TAT), the CPU allocation delay time being time from a time point that the virtual machine requests for allocation of the CPU to a time point that the CPU is allocated to the virtual machine, the TAT being time from a time point that a processing is requested to a time point that a processing result is outputted; and generating an estimation formula based on a result of measurement with respect to the CPU allocation delay time and the TAT, the estimation formula including the scheduling parameter and the CPU allocation delay time as explanatory variables and an estimated TAT as an objective variable, wherein the processor utilizes the estimation formula expressed as:

$$TAT = A \times \text{delay time} + B \times \text{scheduling parameter} + C,$$

where A, B, and C are coefficients, and determines the coefficients A, B, and C based on the measurement results of the CPU allocation delay time and the TAT.

10. The performance prediction method of claim 9, further comprising securing an upper limit of the TAT according to Service Level Agreement (SLA) based on the estimated TAT.

11. A non-transitory program storage medium storing a computer program, the computer program executed by a computer connected to a virtual computer system including a virtual machine that utilizes a physical machine having a central processing unit (CPU) and a scheduler that determines a CPU time to be allocated to the virtual machine based on a scheduling parameter, the computer program cause the computer to perform:

setting a sample value in the scheduling parameter and activating the virtual computer system and measuring a CPU allocation delay time and a turn around time (TAT), the CPU allocation delay time being time from a time point that the virtual machine requests for allocation of the CPU to a time point that the CPU is allocated to the virtual machine, the TAT being time from a time point that a processing is requested to a time point that a processing result is outputted; and generating an estimation formula based on a result of measurement with respect to the CPU allocation delay time and the TAT, the estimation formula including the scheduling parameter and the CPU allocation delay time as explanatory variables and an estimated TAT as an objective variable, wherein the computer program cause the computer to perform utilizing the estimation formula expressed as:

$TAT = A \times \text{delay time} + B \times \text{scheduling parameter} + C$, where A, B, and C are coefficients, and
determines the coefficients A, B, and C based on the measurement results of the CPU allocation delay time and the TAT.

12. The non-transitory program storage medium of claim 11, further comprising securing an upper limit of the TAT according to Service Level Agreement (SLA) based on the estimated TAT.

\* \* \* \* \*